US006236984B1

(12) United States Patent
Owens et al.

(10) Patent No.: US 6,236,984 B1
(45) Date of Patent: *May 22, 2001

(54) METHOD AND SYSTEM OF MANAGING CONTRACT NEGOTIATION RECORDS

(75) Inventors: Geoffrey M. Owens, Plano; Timothy A. Benners, Garland, both of TX (US)

(73) Assignee: Electronic Data Systems Corporation, Plano, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/980,351

(22) Filed: Nov. 26, 1997

(51) Int. Cl.[7] .................................................... G06F 17/30
(52) U.S. Cl. ................................................ 707/1; 707/203
(58) Field of Search .................................... 707/1, 2, 505, 707/506, 201, 531, 104, 203

(56) References Cited

U.S. PATENT DOCUMENTS

| 5,272,623 | * | 12/1993 | Grubb et al. .......................... 395/701 |
| 5,526,520 | * | 6/1996 | Krause ................................. 707/104 |
| 5,692,206 | * | 11/1997 | Shirley et al. ........................ 707/531 |
| 5,872,640 | * | 2/1999 | Cohen et al. .......................... 358/434 |
| 5,924,109 | * | 7/1999 | Ackerman et al. ................... 707/531 |

* cited by examiner

Primary Examiner—Hosain T. Alam
Assistant Examiner—Sanjiv Shah
(74) Attorney, Agent, or Firm—Baker Botts, LLP

(57) ABSTRACT

The method and system of managing contract negotiation records may comprise a contract table (44), a plurality of activity tables (46) and a contract interface (124). The contract table (44) may comprise a plurality of contract records (50) each having a plurality of fields of contract data (54) and a unique contract identifier (52). The activity tables (46) may each comprise a plurality of activity records (100) associated with one of the contract records (50) to form a contract negotiation record (40). Each of the activity records (100) may have a plurality of fields of activity data (104). The contract interface (124) may be displayed as a series of graphical displays providing selections for manipulating at least one of the contract negotiation records (40). A selection to manipulate a contract negotiation record (40) may be received via the contract interface (124) and automatically processed.

21 Claims, 22 Drawing Sheets

FIG. 2A

| UNIQUE CONTRACT IDENTIFIER | NEGOTIATOR | | | CONTRACTING PARTY | | | | | | | CONTRACT | | |
|---|---|---|---|---|---|---|---|---|---|---|---|---|---|
| | I.D. | PHONE | LOCATION | I.D. | ADDRESS | CONTACT | PHONE | FAX | INTERNET | CLASSIFICATION | RELEVANT DATES | TYPE | STATUS | DESCRIPTION |
| 10001 | 62 | 64 | 66 | 70 | 72 | 74 | 76 | 78 | 80 | 82 | 90 | 92 | 94 | 96 |
| 10002 | | | | | | | | | | | | | | |
| 10003 | | | | | | | | | | | | | | |
| 10004 | | | | | | | | | | | | | | |

FIG. 2B

| UNIQUE CONTRACT IDENTIFIER | ACTIVITY DATE | ACTIVITY STATUS |
|---|---|---|
| 10002 | | |
| 10002 | | |
| 10002 | | |

FIG. 2C

| UNIQUE CONTRACT IDENTIFIER | NEGOTIATOR ||| CONTRACTING PARTY ||||||| CONTRACT |||
|---|---|---|---|---|---|---|---|---|---|---|---|---|
| | I.D. | PHONE | LOCATION | I.D. | ADDRESS | CONTACT | PHONE | FAX | INTERNET | CLASSIFICATION | RELEVANT DATES | TYPE | STATUS | DESCRIPTION |
| 10001 | 144 | 146 | 148 | 150 | 152 | 154 | 156 | 158 | 160 | 162 | 170 | 172 | 174 | 176 |

FIG. 2D

| RECORD NUMBER | ORGANIZATION CODE | ORGANIZATION UNIT |
|---|---|---|
| 1 | 210 | LEGAL AFFAIRS |
| 2 | 210 | PUBLIC RELATION |
| 3 | 210 | CREDIT UNION |
| 4 | 220 | LEGAL AFFAIRS |
| 5 | 220 | CREDIT INION |

Select Contract to Inquire

| Index | Short Name | Legal Name | Negotiator |
|---|---|---|---|
| | | | |
| | | | |
| | | | |
| | | | |
| | | | |
| | | | |
| | | | |
| | | | |
| | | | |
| | | | |
| | | | |
| | | | |
| | | | |
| | | | |

[Next] [Previous] [Go To Inquire] [Dupe] [Close] [Menu]

Record: 1 of 19

*FIG. 4D*

248 — Inquire Contract Activity

Index: ☐  Contract Type: ☐  Status Code: ☐
Short Name: ☐  Legal Name: ☐
Negotiator: ☐  Negotiator Phone: ☐
Prod/Serv: ☐

Activity Date  Activity Status

Next
Previous

Record: 11 of 11

Go To Main | Close | Menu

FIG. 4E

Inquire Contract

Date Submitted: [ ]　　Negotiator: [ ]　　Plano/Troy: [ ]
Date Required: [ ]　　Negotiator Phone: [ ]　　Attorney: [ ]
Status Code: [ ]　　Contract Type: [ ]　　Index: [ ]

Contact1 First/Last: [ | ]
Short Name: [ ]　　Contact1 Phone: [ ]
Legal Name: [ ]　　Contact1 Fax: [ ]
Address 1: [ ]　　Contact1 Internet: [ ]
Address 2: [ ]　　Contact2: [ ]
City: [ ]　　Contact2 Phone: [ ]
State: [ ] Zip: [ ]　　Contact2 Fax: [ ]
　　Contact2 Internet: [ ]
Prod/Serv Description: [ ]

[Dupe] [Requestor] [Buyer] [Admin] [Close] [Menu] 🖨

FIG. 4F

Contract Update

Enter ONE of the following fields to restrict
how many records you wish to view.
Click OK to view, or CLOSE to exit.

Index: [ ]
Short Name: [ ]
Negotiator: [ ▼]
Legal Name: [ ]

[OK] [Close]

Update Contract Activity

Index: [ ]   Contract Type: [ ]   Status Code: [ ]

Short Name: [ ]   Legal Name: [ ]

Negotiator: [ ]   Negotiator Phone: [ ]

Prod/Serv: [ ]

Activity Date   Activity Status

[New]
[Save]

Record: 4  of 4

[Go To Contract]   [Close]

Supplier Profile

If known, enter the supplier profile key

Profile Key: [ ]

−OR−

Enter either or both of the following fields to restrict how many records you wish to view. Enter '*' to view all records.

Negotiator: [ ]

Short Name: [ ]

−THEN−

Click OK to view, ADD to create new profile, or CLOSE to exit.

[OK]   [Add]   [Close]

FIG. 41

Update Contract
—General Information—

Index: [ ]  Contract Type: [ ]  Status Code: [ ▼ ]  Plano/Troy: [ ]

Negotiator: [ ]  Negotiator Phone: [ ]  Attorney: [ ]

Date Submitted: [ ]  Date Required: [ ]  Date Cancelled: [ ]

Prod/Serv Decsription: [ ]

—Supplier Data—

Short Name: [ ]  Minority Owned: [ ]

Legal Name: [ ]

Address1: [ ]

Address2: [ ]

City/State/Zip: [ ] [ ] [ ]

Press Page Down to continue update...

Update Contract
—General Information—

Index: [ ]  Contract Type: [ ]  Status Code: [ ▼ ]  Plano/Troy: [ ]

Negotiator: [ ]  Negotiator Phone: [ ]  Attorney: [ ]

Date Submitted: [ ]  Date Required: [ ]  Date Cancelled: [ ]

Prod/Serv Decsription: [ ]

—Supplier Data—

Short Name: [ ]  Minority Owned: [ ]

Legal Name: [ ]

Address1: [ ]

Address2: [ ]

City/State/Zip: [ ] [ ] [ ]

Press Page Down to continue update...

FIG. 4K

Select Profile Record to Copy From

| Prf Key | Short Name | Legal name | Negotiator |
|---|---|---|---|
| | | | |
| | | | |
| | | | |
| | | | |

[Next] [Previous] [Go To Profile] [Dupe] [Close] [Menu]

Record: 1 of 3

FIG. 4L

Profile Key: [ ]  Supplier Profile

Negotiator: [ ]  Short Name: [ ]  Contract Type: [ ]

Legal Name: [ ]

Prod/Serv Description: [ ]

Address 1: [ ]

Address 2: [ ]

City: [ ]  State: [ ]  Zip: [ ]

Contact1 First: [ ]

Contact1 Last: [ ]  Contact2: [ ]

Contact1 Phone: [ ]  Contact2 Phone: [ ]

Contact1 Fax: [ ]  Contact2 Fax: [ ]

Contact1 Internet: [ ]  Contact2 Internet: [ ]

Attorney: [ ]  Minority: [ ]

[Add New Profile] [Dupe] [Save] [Close] [Menu]

Record: 1 of 1

Add Contract Activity

Index: ☐ Contract Type: ☐ Status Code: ☐
Short Name: ☐ Legal Name: ☐
Negotiator: ☐ Negotiator Phone: ☐
Prod/Serv: ☐

[Close] [🖨]

Activity Date: ☐ [Save]
Activity Status:
☐

|◄ ◄ Record: 1 of 1 ► ►|

Contract Administration Update

Index: ☐   Contract Type: ☐

Short Name: ☐   Legal Name: ☐

Negotiator: ☐   Negotiator Phone: ☐

Prod/Serv: ☐

Date to VCA: ☐   Minority Owned: ☐

Date Completed: ☐   PPA Short Name: ☐

Date Cancelled: ☐   PPA Contract #: ☐

Status Code: ☐   Tax ID #: ☐

Administrator: ☐   D and B #: ☐

[Undo] [Close]

|◀| ◀ |Record:| 1 | of 1 |▶|▶|

---

280

Database Maintenance Menu

*FIG. 4S*

— Select Option —

- ◉ Administrators
- ○ Attorneys
- ○ Contract Type
- ○ MOC/Organization
- ○ Database Users
- ○ Super Users
- ○ Status Codes
- ○ Archive Data

[OK] [Close]

282 *FIG. 4T*

Contract History Inquiry — Completed/Cancelled

Enter Index for exact match

Index: [ ]

– OR –

Enter Year ('*' for all years) and ONE of the following
fields to restrict how many records you wish to view.
Click OK to view, or CLOSE to exit.

Year: [ ▼]

Short Name: [ ]

Negotiator: [ ▼]

Legal Name: [ ]

[OK]  [Close]

Select History Contract to Inquire

| Index | Short Name | Legal Name | Negotiator |
|---|---|---|---|
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |

Next | Previous | Go To History | Dupe | Close | Menu

Record: 1 of 71

FIG. 4V

Inquire History

- Year:
- Date Submitted:
- Date Required:
- Status Code:
- Short Name:
- Legal Name:
- Address 1:
- Address 2:
- City:
- State: Zip:
- Prod/Serv Description:

- Negotiator:
- Negotiator Phone:
- Contract Type:

- Plano/Troy:
- Attorney:
- Index:

- Contact1 First/Last:
- Contact1 Phone:
- Contact1 Fax:
- Contact1 Internet:
- Contact2:
- Contact2 Phone:
- Contact2 Fax:
- Contact2 Internet:

[Dupe] [Activity] [Requester] [Buyer] [Admin] [Print] [Close] [Menu]

Record: 1 of 1

286

METHOD AND SYSTEM OF MANAGING CONTRACT NEGOTIATION RECORDS

TECHNICAL FIELD OF THE INVENTION

This invention relates generally to the field of data storage, and more particularly to a method and system of managing contract negotiation records.

BACKGROUND OF THE INVENTION

Businesses may employ computer systems to maintain and track contract records. The contract records may include significant events and discussions occurring during the life of the negotiating process of individual contracts, up to and including the completion and signing of these contracts. The contract records may be stored in a database and accessed by a user through an interface.

Conventional contract interfaces are often text-based and accordingly cumbersome to use. Conventional interfaces generally also lack functionality that allow contract records to be efficiently reviewed, updated and common information shared between contract records.

SUMMARY OF THE INVENTION

In accordance with the present invention, a method and system of managing contract negotiation records is provided that substantially eliminates or reduces the disadvantages and problems associated with other systems and methods.

In accordance with the present invention, a method and system of managing contract negotiation records may comprise a contract table, a plurality of activity tables and a contract interface. The contract table may comprise a plurality of contract records each having a plurality of fields of contract data and a unique contract identifier. The activity tables may each comprise a plurality of activity records associated with one of the contract records to form a contract negotiation record. Each of the activity records may have a plurality of fields of activity data. The contract interface may be displayed as a series of graphical displays providing selections for manipulating at least one of the contract negotiation records. A selection to manipulate a contract negotiation record may be received via the contract interface and automatically processed.

More specifically, in accordance with one embodiment of the present invention, a contract negotiation record may be selected for duplication. In this embodiment, at least some of the fields of data of the selected contract negotiation record may be automatically duplicated to generate duplicated fields of data. The duplicated fields of data in a new unique contract identifier associated with the duplicated fields of data may be automatically stored. In this particular embodiment, the duplicated fields of data and the associated new unique contract identifier may be stored as a new contract negotiation record in a table comprising the selected contract negotiation record. In another embodiment, the duplicated fields of data and associated new unique contract identifier may be separately stored as a contract profile.

Important technical advantages of the present invention include providing an improved method and system of managing contract negotiation records. In particular, the invention provides a highly intuitive, menu-driven interface to manipulate contract negotiation records. Accordingly, contract negotiation records may be efficiently accessed, viewed, updated or otherwise manipulated by users.

Another important technical advantage of the present invention includes providing increased functionality for manipulating contract negotiation records. In particular, the contract negotiation records may be duplicated and stored as a new contract negotiation record and/or as a contract profile. In addition, reports are provided that include useful information to users such as managers and team leaders about the progress of contracts and related negotiations. Accordingly, data of the contract negotiation records may be efficiently shared and otherwise utilized by users.

Other technical advantages of the present invention will be readily apparent to those skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, in which:

FIGS. 2A–D illustrate contract, activity, profile and organization tables in accordance with one embodiment of the present invention;

DETAILED DESCRIPTION OF THE INVENTION

The preferred embodiments of the present invention and its advantages are best understood by referring now in more detail to FIGS. 1–7 of the drawings, in which like numerals refer to like parts throughout the several views. FIGS. 1–7 illustrate a method and system of managing contract negotiation records. As described in more detail below, the system and method may comprise contract and activity tables storing the contract negotiation records and a contract interface. The contract interface may be displayed as a series of graphical displays providing selections for manipulating the contract negotiation records. Selections to manipulate the contract negotiation records may be received via the contract interface and automatically process. The selections may include duplicating, archiving, preparing reports from the contract negotiation records and the like. Duplicated contract negotiation records may be stored as new contract negotiation records or as contract profiles. Accordingly, the present invention provides an improved interface that is intuitive and includes improved functionality for efficiently managing contract negotiation records.

Figure 1:
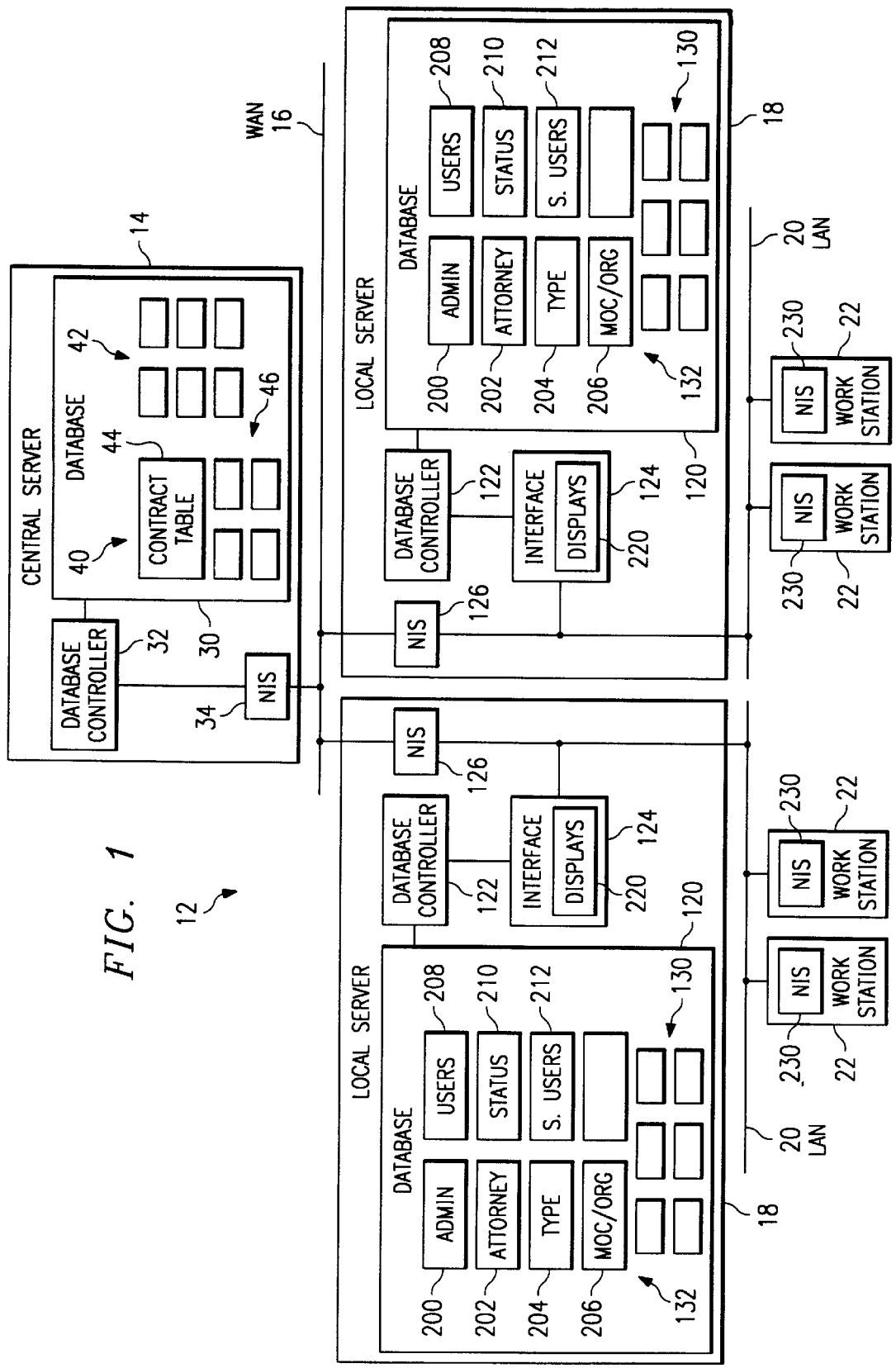
FIG. 1 illustrates a schematic block diagram of a distributed contract management system including a central server, local servers, and work stations in accordance with one embodiment of the present invention.

FIG. 1 illustrates a contract management system 12 in accordance with one embodiment of the present invention.

In this embodiment, the contract management system 12 may comprise a central server 14 in communication via a wide area network (WAN) 16 with a plurality of local servers 18. The local servers 18 may each be in communication via a local area network (LAN) 20 with a plurality of work stations 22. It will be understood that the contract management system 12 may comprise other elements and/or otherwise communicate between elements and still remain within the scope of the present invention.

The central server 14 may be a computer such as a file server, mainframe, or any other type of computer capable of storing and processing data. In one embodiment, the central server 14 may comprise a database 30, a database controller 32 and a network interface system (NIS) 34. It will be understood that the central server 14 may be otherwise configured and/or comprise other elements and still remain within the scope of the present invention.

The database 30 may be a relational database, such as an ORACLE database. In this embodiment, database 30 may store information in tables comprising rows and columns of data. As described in more detail below, each row may represent a data record while each column may represent a field of the data record. It will be understood that the database 30 may comprise other types of databases and/or otherwise store data and still remain within the scope of the present invention.

The database 30 may comprise contract negotiation records 40 and archived contract negotiation records 42. In one embodiment, the contract negotiation records 40 may together be partly stored in a contract table 44 with the remainder of each record 40 stored in a separate activity table 46. This configuration may be preferred to reduce access times to the contract negotiation records. It will be understood that the contract negotiation records 40 may be otherwise stored and still remain within the scope of present invention. For example, the contract negotiation records 40 may each be stored together as is the case with the archived contract negotiation records 42. It will be further understood that the database 30 may comprise other data elements and still remain within the scope of the present invention.

FIG. 2A illustrates the contract table 44 in accordance with one embodiment of the present invention. In this embodiment, the contract table 44 may comprise a plurality of contract records 50. Each contract record 50 may comprise a unique contract identifier 52 and a plurality of fields of contract data 54. In one embodiment, the unique contract identifier 52 may comprise a five-digit number that is unique for each contract record 50. It will be understood that each contract record 50 may be otherwise uniquely identified and still remain within the scope of the present invention. It will be further understood that the contract table 44 may comprise other information and still remain within the scope of the present invention.

The fields of contract data 54 may comprise negotiator information 56, contracting party information 58 and contract information 60. It will be understood that fields of contract data 54 may comprise other information and still remain within the scope of the present invention.

The negotiator information 56 may comprise a negotiator ID 62, a negotiator phone number 64 and a negotiator location 66. The negotiator ID 62 may comprise the name of the negotiator. The negotiator information 56 allows the negotiators responsible for contracts with a business to be easily identified and contacted from the contract negotiation records 40. It will be understood that the negotiator information 56 may comprise other information and still remain within the scope of the present invention.

The contracting party information 58 may comprise a contracting party ID 70, a contracting party address 72, a contact of the contracting party 74, a phone number of the contact 76, a fax number of the contact 78, an Internet address of the contact 80 and a classification of the contracting party 82. The contracting party ID 70 may comprise the name of the contracting party. The classification 82 may be a minority or other type of classification of the contracting party. The contracting party information 58 allows the contracting parties negotiating with the business to be easily identified and contacted from the contract negotiation records 40. It will be understood that the contracting party information 58 may comprise other information and still remain within the scope of the present invention.

The contract information 60 may comprise relevant dates of the contract 90, contract type or classification 92, contract status 94 and contract description 96. The contract status 94 may be as active, inactive or the like. The contract information 60 provides general information about each contract negotiation record 40. It will be understood that the contract information 60 may comprise other information and still remain within the scope of the present invention.

FIG. 2B illustrates one of the activity tables 46 in accordance with one embodiment of the present invention. In this embodiment, the activity table 46 may comprise a plurality of activity records 100 associated with one of the contract records 50 to form one of the contract negotiation records 40. Each activity record 100 may comprise a unique contract identifier 102 and a plurality of fields of activity data 104. The unique contract identifier 102 may be the unique contract identifier 52 of a contract record 50 to associate the activity records 100 with a contract record 50 to form a contract negotiation record 40. In this embodiment, the unique contract identifier 102 may comprise a five-digit number as previously described in connection with the unique contract identifier 52. It will be understood that the activity records 100 may be otherwise associated with the contract records 50 and still remain within the scope of the present invention. It will be further understood that the activity table 46 may comprise other information and still remain within the scope of the present invention.

The fields of contract data 104 may comprise an activity date information 106 and an activity status information 108. In this embodiment, the activity status information 108 may record activity regarding a contract negotiation record and the activity date information 106 may record the date of that activity. It will be understood that the fields of contract data 104 may comprise other information and still remain within the scope of the present invention.

Returning to FIG. 1, the archived contract negotiation records 42 may each comprise the contract record 50 and the associated activity records 100 of an inactive contract negotiation record. As described in more detail below, a contract record 50 may be removed from the contract table 44 and stored with its associated activity records 100 to form an archived contract negotiation record 42. Accordingly, it may be preferred to store a contract negotiation record 40 in parts as a contract record 50 and associated activity records 100 while the contract negotiation record 40 is active in order to efficiently search and retrieve the contract negotiation records 40 from the database 30 and to combine the contract record 50 and the associated activity records 100 into an archive file when the contract negotiation record is inactive. It will be understood that the active and archived contract negotiation records 40 and 42 may be otherwise stored and still remain within the scope of the present invention.

The database controller 32 may access the database 30 to retrieve and/or update the contract negotiation records 40 and the archived contract negotiation records 42. For the ORACLE embodiment of the database 30, the database controller 32 may be an ORACLE database controller. It will be understood that database 30 may be otherwise accessed and still remain within the scope of the present invention.

The network interface system (NIS) 34 of the central server 14 may communicate with the wide area network (WAN) 16 to receive requests and information from the local server 18 and to transmit information to the local server 18. It will be understood that the central server 14 may otherwise communicate with the local server 18 and/or other elements of the contract management system 12 and still remain within the scope of the present invention.

The wide area network (WAN) 16 may comprise an Integrated Services Digital Network (ISDN) communication line, a hardwire line, telephone link or the like. It will be understood that the wide area network (WAN) 16 may comprise other types of communication links and still remain within the scope of the present invention.

The local server 18 may be a computer such as a file server, a mainframe or any other type of computer capable of storing and processing data. In one embodiment, the local server 18 may comprise a database 120, a database controller 122, an interface 124 and a network interface system (NIS) 126. It will be understood that the local server 18 may comprise other elements and still remain within the scope of the present invention.

The database 120 may be a relational database, such as an ORACLE database. In this embodiment as previously described in connection with the database 30 of the central server 14, the database 120 may store information in tables comprising rows and columns of data. As described in more detail below, each row may represent a data record while each column may represent a field of the data record. It will be understood that the database 120 may comprise other types of databases and/or otherwise store data and still remain within the scope of the present invention.

The database 120 may comprise contract profiles 130 and administration tables 132. It will be understood that the database 120 may comprise other data elements and still remain within the scope of the present invention.

The contract profiles 130 may comprise the contract data of often used contracting parties. As described in more detail below, the contract profiles 130 may be used as a template to generate new contract negotiation records 40 for contracts dealing with the often used contracting parties. Accordingly, common information between similar contracts need not be reentered each time but can be obtained from the contract profiles 130. It will be understood that the contract profiles 130 may be otherwise configured and/or stored and still remain within the scope of the present invention.

FIG. 2C illustrates one of the contract profiles 130 in accordance with one embodiment of the present invention. In one embodiment, each contract profile 130 may comprise a unique contract identifier 134 and fields of contract data 136. As previously described in connection with the unique contract identifier 52, the unique contract identifier 134 may comprise a five-digit number that uniquely identifies the contract profile 130. It will be understood that the contract profile 130 may be otherwise identified and still remain within the scope of the present invention. It will be further understood that the contract profile 130 may comprise other information and still remain within the scope of the present invention.

The fields of contract data 136 may comprise negotiator information 138, contracting party information 140 and contract information 142. It will be understood that the fields of contract data 136 may comprise other information and still remain within the scope of the present invention.

A negotiator information 138 may comprise a negotiator ID 144, a negotiator phone number 146 and a negotiator location 148. The negotiator ID 144 may comprise the name of the negotiator. The negotiator information 138 allows the negotiators responsible for the contracts with a business to be easily identified and contacted from the contract negotiation records 40. It will be understood that the negotiator information 138 may comprise other information and still remain within the scope of the present invention.

The contracting party information 140 may comprise a contracting party ID 150, a contracting party address 152, a contact of a contracting party 154, a telephone number of the contact 156, a fax number of the contact 158, an Internet address of the contact 160 and a classification of the contracting party 162. The contracting party ID 150 may comprise the name of the contracting party. The classification 162 may be a minority or other type of classification of the contracting party. The contracting party information 140 allows the contracting parties negotiating with the business to be easily identified and contacted from the contract negotiation records 40. It will be understood that the contracting party information 140 may comprise other information and still remain within the scope of the present invention.

The contact information 142 may comprise relevant dates of the contract 170, contract type of classification 172, contract status 174 and contract description 176. The contract status 174 may be active, inactive or the like. The contract information 142 provides general information about each contract negotiation record 40. It will be understood that the contract information 142 may comprise other information and still remain within the scope of the present invention.

Returning to FIG. 1, the administration tables 132 may comprise an administrators table 200, an attorney table 202, a contract type table 204, an organization table 206, a users table 208, a super users table 210 and a status table 212. It will be understood that the database 120 may comprise other administration tables 132 and still remain within the scope of the present invention.

The administrators table 200 may comprise a list of contract administrators authorized to administer contracts and manipulate the contract negotiation records 40. The attorney table 202 may comprise a list of attorneys that support the contracting process. The contract type table 204 may comprise a list of the types or classifications of contract negotiation records. Contract classifications may include master agreements, letter agreements, amendments to master agreements, third-party agreements in addition to the subject matter of the contract such as software, telecommunications and the like. It will be understood that the administrators table 200, attorney table 202 and contract type table 204 may be otherwise configured and still remain within the scope of the present invention.

The organization table 206 may comprise a listing of various organizations of a business. FIG. 2D illustrates the organization table 206 in accordance with one embodiment of the present invention. In this embodiment, the organization table 210 may comprise a plurality of records 220 each having a unique identifier 222, a non unique organization code 224 and a non unique organization unit 226 within the code 224. In one embodiment, the unique identifiers 222 may comprise sequential record numbers such as 1, 2, 3, etc. The organization codes and units 224 and 226 allow contract negotiation records 40 and associated costs to be attributed to the correct business unit of the business. It will be understood that the organization table 206 may comprise other information and still remain within the scope of the present invention.

The users table 208 may comprise a listing of all personnel who have responsibility for negotiating contracts and that may manipulate the contract negotiation records 40. The super users table 210 may comprise a list of all personnel who have responsibility for administrating the database 120. Accordingly, the super users may update the administration tables 132 to add or delete contract administrators, attorneys, contract types, organizations, users, super users and status codes. It will be understood that the users table 208 and super users table 210 may be otherwise configured and still remain within the scope of the present invention. It will be further understood that the administration tables 132 may be otherwise updated and still remain within the scope of the present invention.

The status table 212 may comprise a list of status codes into which the contract negotiation records 40 may be classified. In one embodiment, the status phase may include an active, closed, and canceled status of the contract negotiation records 40. It will be understood that the status contract table 212 may be otherwise configured within the scope of the present invention.

The database controller 122 may comprise access to database 120 to retrieve and/or update the contract profiles 130 and administration tables 132. For the ORACLE embodiment of the database 120, the database controller 122 may be an ORACLE database controller. It will be understood that the database 120 may be otherwise accessed and still remain within the scope of the present invention.

Interface 124 may be a graphical user interface (GUI) that provides access to the databases 30 and 120. In one embodiment, as described in more detail below, interface 124 may comprise a plurality of displays 220 providing selections for manipulating contract negotiation records 40 and archived contract negotiation records 42 of the database 30 and the contract profiles 130 and administration tables 132 of the database 120. It will be understood that the interface 124 may otherwise access the databases 30 and 120 and still remain within the scope of the present invention.

The network interface system (NIS) 126 may communicate with the wide area network (WAN) 16 and the local area network (LAN) 20 to receive and transmit information to and from the central server 14 and the work stations 22. It will be understood that the local server 18 may otherwise communicate with the central server 14 and/or work stations 22 and still remain within the scope of the present invention.

The local area network (LAN) 20 may comprise an Integrated Services Digital Network (ISDN) communication line, a hardwire line, telephone link, or the like. It will be understood that the local area network (LAN) 20 may comprise other types of communication links and still remain within the scope of the present invention.

The work stations 22 may each comprise a computer such as a personal computer, minicomputer, mainframe or any other computer capable of receiving and processing information. In one embodiment, the work stations 22 may comprise a network interface system (NIS) 230 in communication with the local area network (LAN) 22 to transmit requests and receive information from the interface 124 of the local server 18. It will be understood that the work stations 22 may otherwise communicate with the interface 124 and/or databases 30 and 120 and still remain within the scope of the present invention.

In accordance with the present invention, a user of the contract management system 12 may request the contract interface 124 from the work station 22. The request may be validated or unvalidated. Preferably, the request is validated to ensure that only authorized users are allowed access to the contract negotiation records 40, archived contract negotiation records 42 and other records of the databases 30 and 120. As previously described, the authorized users may include a subset of super users authorized access to the administration functions of the interface 124. Accordingly, validation of a request for the interface 124 may include setting a flag for super users that allows access to the administration functions. It will be understood that the interface 124 may be otherwise requested by a user and still remain within the scope of the present invention. It will be further understood that the request for the contract interface 124 may be otherwise validated or not validated and still remain within the scope of the present invention.

Figure 3:
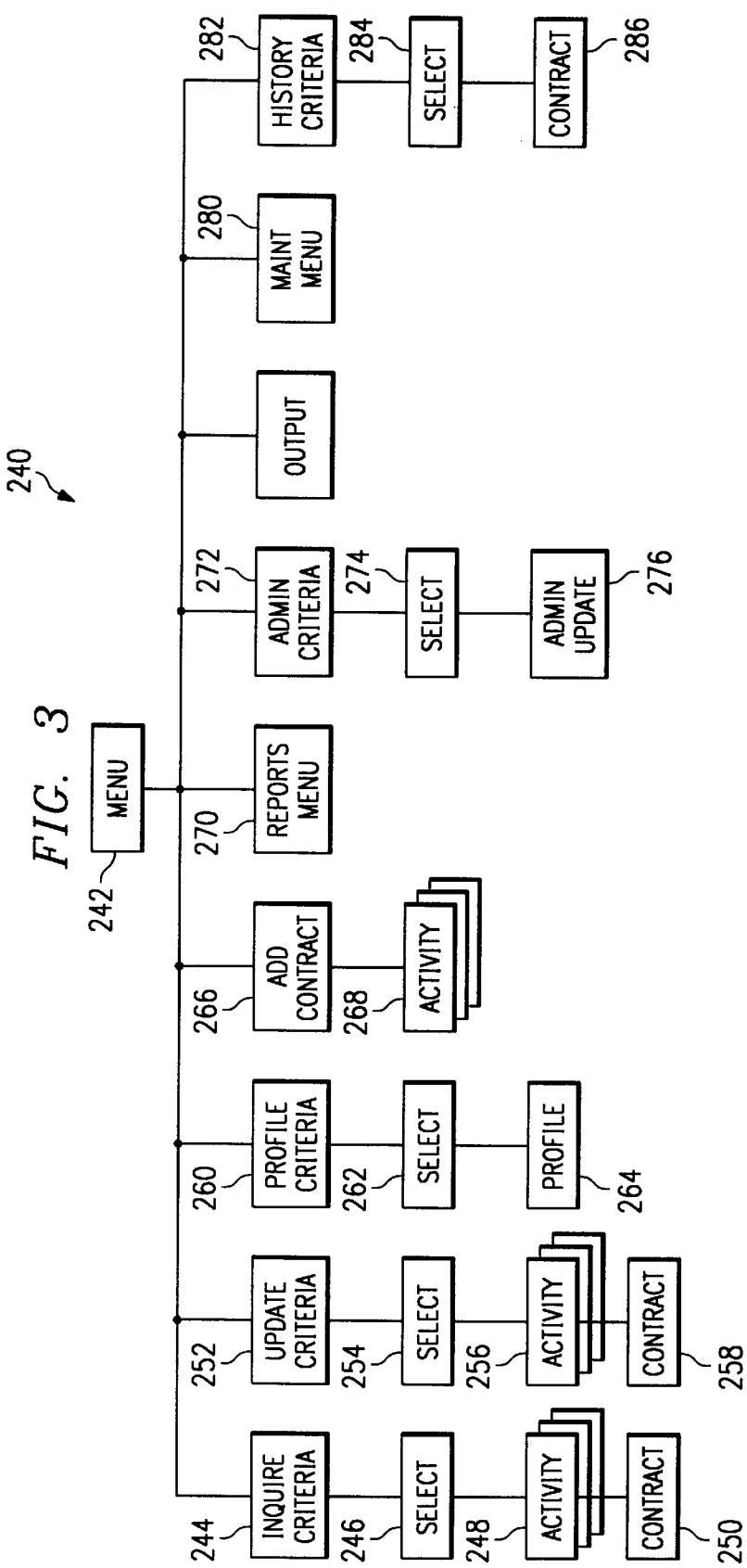
FIG. 3 illustrates a schematic block diagram of an interface menu of displays in accordance with one embodiment of the present invention.
Figure 4A:
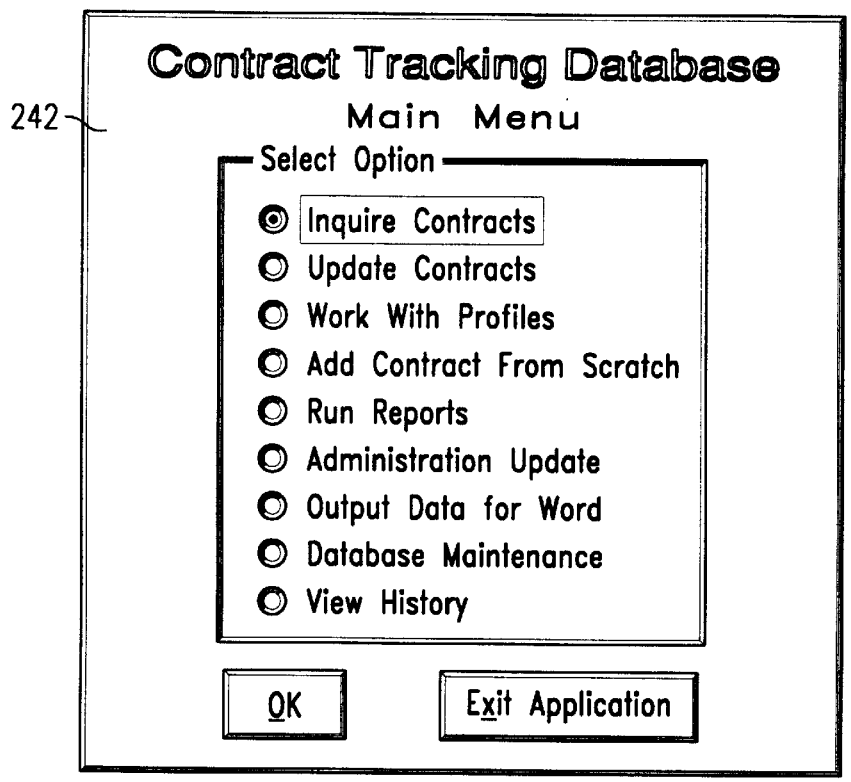
FIGS. 4A–V illustrate exemplary computer displays providing selections for manipulating records of the contract management system in accordance with one embodiment of the present invention.

In response to a request for the contract interface 124, the contract management system 12 may display the interface 124 as a series of graphical displays of providing selections for manipulating the contract negotiation records 40, archived contract negotiation records 42 and other data records of the databases 30 and 120. FIG. 3 illustrates a menu of graphical displays 240 of the interface 124 in accordance with one embodiment of the present invention. FIGS. 4A–V illustrate the displays of the menu 240 programmed with MICROSOFT ACCESS in accordance with one embodiment of the present invention. It will be understood that the interface 124 may be otherwise configured for display and still remain within the scope of the present invention. It will be further understood that the interface 124 may comprise other displays and still remain within the scope of the present invention.

The menu of displays 240 may include a main menu display 242. FIG. 4A illustrates the main menu display 242 in accordance with one embodiment of the present invention. In this embodiment, the main menu display 242 may include selections to Inquire Contracts, Update Contracts, Work With Profiles, Add Contracts, Write Reports, Administration Updates, Output Data, Database Maintenance and New History. The user may also select to exit the interface 124 from the main menu display 242. It will be understood that the main menu display 242 may be otherwise configured and/or include other selections and still remain within the scope of the present invention.

Figure 4B:
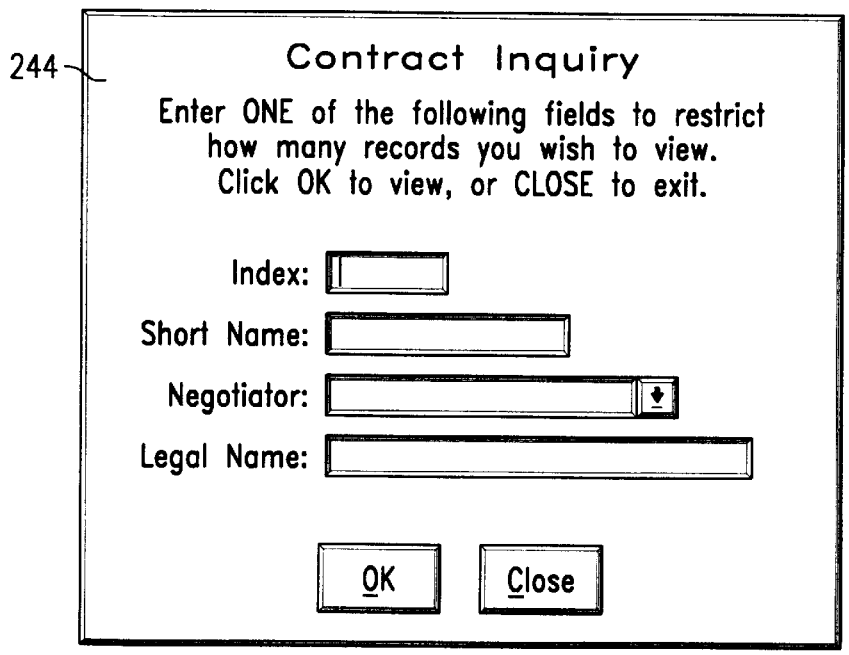

In response to receipt of an Inquire Contract selection, the interface 124 may display an inquire criteria display 244. FIG. 4B illustrates the inquire criteria display 244 in accordance with one embodiment of the present invention. In this embodiment, the inquire criteria display 244 may include a plurality of searchable data fields. The user may enter search criteria into one or more appropriate data fields and click "OK" to request a search. It will be understood that the inquire criteria display 244 may be otherwise configured and/or comprise other selections and still remain within the scope of the present invention.

Results from the search may be displayed in an inquire select display 246. FIG. 4C illustrates the inquire select display 246 in accordance with one embodiment of the present invention. In this embodiment, the inquire select display 246 may display summary information of contract negotiation records 40 matching the search criteria. The summary information may comprise the short and legal name of the contracting party and the name of the negotiator. The user may select one of the contract negotiation records and click "GO TO INQUIRE" to view activity records 100 of the selected contract negotiation record 40. It will be understood that the inquire select display 246 may be otherwise configured and/or comprise other selections and still remain within the scope of the present invention.

The interface 124 may display activity records 100 of a selected contract negotiation record 40 in an inquire activity display 248. FIG. 4D illustrates the inquire activity display 248 in accordance with one embodiment of the present invention. In this embodiment, the inquire activity display 248 may comprise summary information and the activity records 100 of the selected contract negotiation record 40. The activity records 100 may be viewed using "NEXT" and "PREVIOUS" selections. The user may select "GO TO MAIN" to view the contract record 50 of the selected contract negotiation record 40. It will be understood that the inquire activity display 248 may be otherwise configured and/or comprise other selections and still remain within the scope of the present invention.

The interface 124 may display the contract record 50 of the selected contract negotiation record 40 in an inquire contract display 250. FIG. 4E illustrates the inquire contract display 250 in accordance with one embodiment of the present invention. In this embodiment, the inquire contract display 250 may display the fields of data 54 of the contract record 50. The user may select "DUPE" to start a new contract negotiation record 40 including the fields of data 54 of the selected contract negotiation record 40. Accordingly, common information may be shared between contract negotiation records and need not be reentered. It will be understood that the inquire contract display 250 may be otherwise configured and/or include other selections and still remain within the scope of the present invention.

Returning to the main menu display 242, in response to receipt to an Update Contracts selection, the interface 124 may display a contract update display 252. FIG. 4F illustrates the contract update display 252 in accordance with one embodiment of the present invention. In this embodiment, the contract update display 252 may include a plurality of searchable data fields. The user may enter search criteria into one or more appropriate data fields and click "OK" to request a search. It will be understood that the contract update display 252 may be otherwise configured and/or comprise other selections and still remain within the scope of the present invention.

Figure 4G:

Results of the search may be displayed in an update select display 254. FIG. 4G illustrates the update select display 254 in accordance with one embodiment of the present invention. In this embodiment, the update select display 254 may display summary information of contract negotiation records 40 matching the search criteria. The summary information may comprise the short and legal name of the contracting party and the name of the negotiator. The user may select one of the contract negotiation records and click "GO TO UPDATE" at activity records 100 of the selected contract negotiation record 40. It will be understood that the update select display 254 may be otherwise configured and/or comprise other selections within the scope of the present invention.

Interface 124 may display a new activity record 100 for the selected contract negotiation record 40 in an update activity display 256. FIG. 4H illustrates the update activity display 256 in accordance with one embodiment of the present invention. In this embodiment, the update activity display 256 may comprise summary information of the selected contract negotiation record 40 and an activity record 100 having a current date and an empty activity status. The activity records 100 may be added using the "NEW" and "SAVE" selections. The user may select "GO TO CONTRACT" to update the contract record 50 of the selected contract negotiation record 40. It will be understood that the update activity display 256 may be otherwise configured and/or comprise other selections and still remain within the scope of the present invention.

The interface 124 may display the contract record 50 of the selected contract negotiation record 40 in an update contract display 258. FIG. 4I illustrates the update contract display 258 in accordance with one embodiment of the present invention. In this embodiment, the update contract display 258 may display the fields of data 54 of the contract record 50. The user may select "UPDATE" to save any changes entered into the displayed fields of contract data 54. It will be understood that the update contract display 258 may be otherwise configured and/or include other selections and still remain within the scope of the present invention.

Return to the main menu display 242, in response to receipt of a Work With Profiles selection, the interface 124 may display a profile inquiry display 260. FIG. 4J illustrates the profile inquiry display 260 in accordance with one embodiment of the present invention. In this embodiment, the profile inquiry display 260 may include a plurality of searchable data fields. The user may enter search criteria into one or more of the appropriate data fields and click "OK" to request a search. It will be understood that the profile inquiry display 260 may be otherwise configured and/or comprise other selections and still remain within the scope of the present invention.

Results from the search may be displayed in a profile select display 262. FIG. 4K illustrates the profile select display 262 in accordance with one embodiment of the present invention. In this embodiment, the profile select display 262 may display summary information of contract profiles 130 matching the search criteria. The summary information may comprise the short and legal name of the contracting party and the name of the negotiator. The user may select one of the contract profiles 130 and click "GO TO PROFILE" to view the selected contract profile 130. It will be understood that the profile select display 262 may be otherwise configured and/or comprise other selections within the scope of the present invention.

The interface 124 may display the selected profile 130 in a profile display 264. FIG. 4L illustrates the profile display 264 in accordance with one embodiment of the present invention. In this embodiment, the profile display 264 may display the fields of data 136 of the contract profile 130. The user may select "ADD NEW PROFILE" to create a new profile. The user may select "DUPE" to start a new contract negotiation record 40 including the fields of data 136 of the selected contract profile 130. Accordingly, information may be shared between contract profiles 130 and contract negotiation records 40. It will be understood that the profile display 264 may be otherwise configured and/or include other selections and still remain within the scope of the present invention.

Figure 4M:

Return to the main menu display 242, in response to receipt of an Add Contract selection, the interface 124 may display an add contract display 266. FIG. 4M illustrates the add contract display 266 in accordance with one embodiment of the present invention. In this embodiment, the Add Contract display 266 may display empty fields of data 54 of a contract record 50 for a contract negotiation record 40 to be added. The user may enter information into the empty fields and select "SAVE" to generate the new contract negotiation record 40. In entering data into the empty fields, and as described in more detail below, the user may enter data from a plurality of fields of the organization table 206 of the database 120. The user may select "ACTVY" to add an activity record for the new contract negotiation record 40. It will be understood that the add contract display 266 may be otherwise configured and/or comprise other selections and still remain within the scope of the present invention.

Figure 4O:
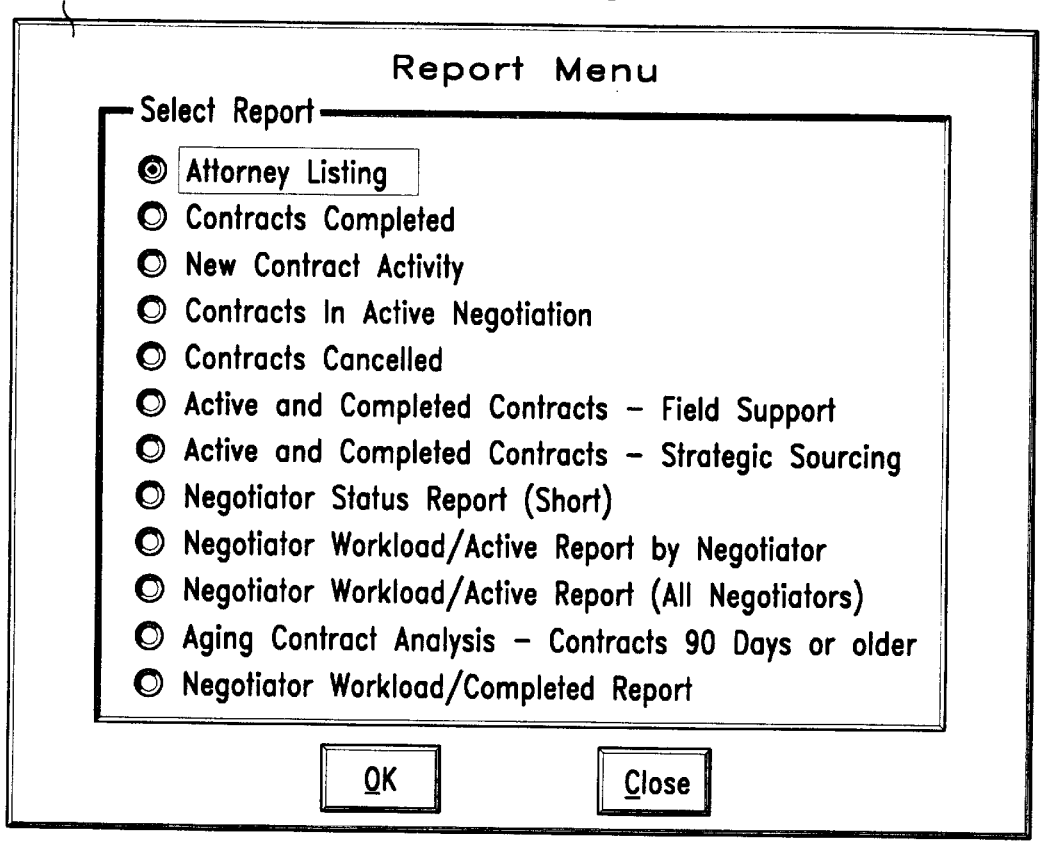

The interface 124 may display a new activity record 100 of the new contract negotiation record 40 in an add activity display 268. FIG. 4N illustrates the add activity display 268 in accordance with one embodiment of the present invention. In this embodiment, the add activity display 268 may comprise summary information at a new activity record 100. The user may enter an activity and select "SAVE" to store the added activity record 100. It will be understood that the add activity display 268 may be otherwise configured and/or comprise other selections and still remain within the scope of the present invention. Returning to the main menu display 242, and in response to receipt of a Run Reports selection, the interface 124 may display a report menu display 270. FIG. 4O illustrates the report menu display 270 in accordance with one embodiment of the present invention. In this embodiment, the report menu display 270 may include selections to run reports by attorney listing, contracts completed, new contract activity, contracts in active negotiation, contracts canceled, active and complete contracts for field support, active and complete contracts for strategic sourcing, negotiator status report, negotiator work load/active report by negotiator, negotiator work load, active report for all negotiators, aging contract analysis and a complete negotiator work load report. Accordingly, the interface 124 provides an improved report including useful information that may be utilized by users to more efficiently manage the contract negotiation records 40. It will be understood that the report menu display 270 may be otherwise configured and/or comprise other selections within the scope of the present invention.

Figure 4P:
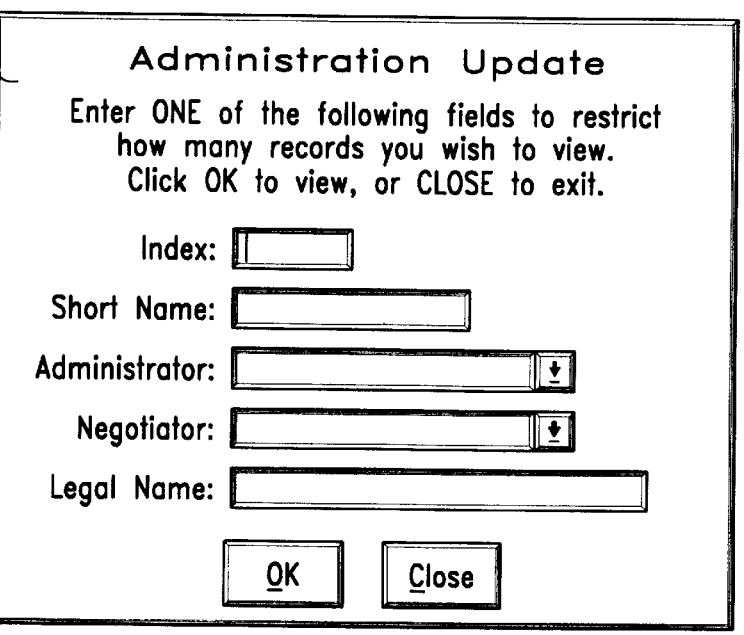

Returning to the main menu display 242, in response to receipt of an Administration Update selection, the interface 124 may display an administration criteria display 272. FIG. 4P illustrates the administration criteria display 272 in accordance with one embodiment of the present invention. In this embodiment, the administration criteria display 272 may include a plurality of searchable data fields. A contract administrator or other proved user may enter search criteria into one or more appropriate data fields and click "OK" to request a search. It will be understood that the administration criteria display 272 may be otherwise configured and/or comprise other selections and still remain within the scope of the present invention.

Figure 4Q:
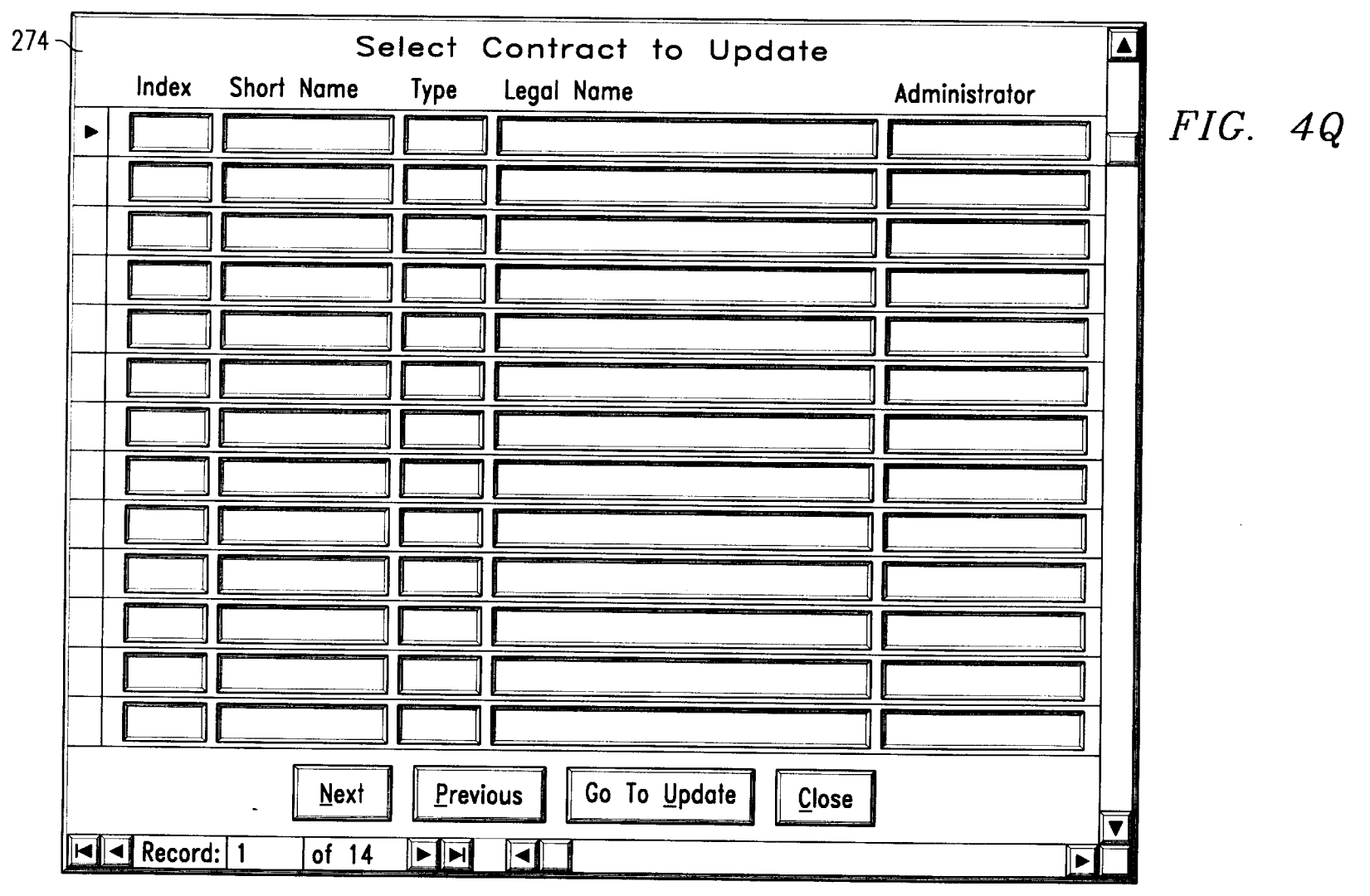

Results of the search may be displayed in an administration select display 274. FIG. 4Q illustrates the administration select display 274 in accordance with one embodiment of the present invention. In this embodiment, the administration select display 274 may display summary information of contract negotiation records 40 matching the search criteria. The summary information may comprise the short and legal name of the contracting party and the administrator of the contract. The contract administrator may select "GO TO UPDATE" to update a contract negotiation record 40. It will be understood that the administrator select display 274 may be otherwise configured and/or comprise other selections and still remain within the scope of the present invention.

The interface 124 may display the selected contract negotiation record 40 in an administration update display 276. FIG. 4R illustrates the administration update display 276 in accordance with one embodiment of the present invention. In this embodiment, the administration update display 276 may comprise summary and administration information of the selected contract negotiation record 40. The summary information may include the short and legal name of the contracting party, the type of contract, the negotiator, and product or services description. The administration information may include the classification of the contract, the responsible administrator, tax information and relevant date information. The contract administrator may enter data into the displayed fields and select "CLOSE" to save the administration update. It will be understood that the administration update display 276 may be otherwise configured and/or comprise other selections and still remain within the scope of the present invention.

Returning to the main menu display 242, in response to receipt of an Output Data selection, interface 124 may allow the user to select the contract negotiation record 40 to be printed. In one embodiment, the contract negotiation records may be written into a MICROSOFT WORD file and then printed in that format. It will be understood that the contract negotiation records 40 may be otherwise printed or outputted and still remain within the scope of the present invention.

In response to receipt of a Database Maintenance selection, the interface 124 may display a database maintenance menu 280. FIG. 4S illustrates the database maintenance menu 280 in accordance with one embodiment of the present invention. In this embodiment, a super user or other authorized user may update the administration table 200, attorney 202, contract type table 204, organization table 206, user table 208, super user table 210 and status table 212. The super user or other authorized users may also archived contract negotiation records 40. As described in more detail below, the contract and activity records 50 and 100 of a contract negotiation record 40 are stored together in an archived contract negotiation record 42. It will be understood that the database maintenance menu display 280 may be otherwise configured and/or comprise other selections within the scope of the present invention.

In response to receipt of a View History selection, the interface 124 may display a history criteria display 282. FIG. 4T illustrates the history criteria display 282 in accordance with one embodiment of the present invention. In this embodiment, the history criteria display 282 may include a plurality of searchable fields of data. The user may enter search criteria into one or more appropriate data fields and click "OK" to request a search. The search may be of completed and canceled contracts only. It will be understood that the history criteria display 282 may be otherwise configured and/or comprise other selections and still remain within the scope of the present invention.

Results from the search may be displayed in a history select display 284. FIG. 4U illustrates the history select display 284 in accordance with one embodiment of the present invention. In this embodiment, the history select display 284 may display summary information of contract negotiation records 40 matching the search criteria. The summary information may comprise the short and legal name of the contracting party and the name of the negotiator. The user may select one of the contract negotiation records 40 and click "GO TO HISTORY" to view the contract record 50 of the selected contract negotiation record 40. It will be understood that the history select display 284 may be otherwise configured and/or comprise other selections and still remain within the scope of the present invention.

The interface 124 may display the contract record 50 of the selected contract negotiation record 40 in a history contract display 286. FIG. 4V illustrates the history contract display 286 in accordance with one embodiment of the present invention. In this embodiment, the history contract display 286 may display the fields of data 54 of the contract record 50. The user may view the contract record 50 and select "DEEP" to start a new contract negotiation record 40 including the fields of data 54 of the selected and closed contract negotiation record 40. Accordingly, common information may be shared between contract negotiation records and need not be reentered. It will be understood that the history contract display 286 may be otherwise configured and/or include other selections and still remain within the scope of the present invention.

Figure 5:
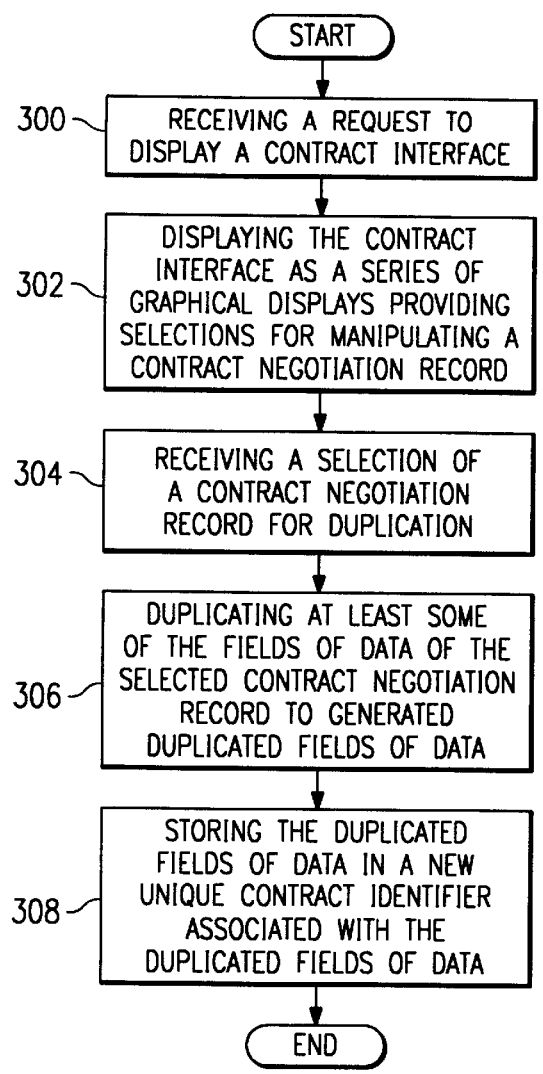
FIG. 5 is a flow chart illustrating a method of duplicating a contract negotiation record in accordance with one embodiment of the present invention.

FIG. 5 is a flow chart illustrating a method of duplicating a contract negotiation record in accordance with one embodiment of the present invention. The method may begin at step 300 with the contract management system 12 receiving a request to display the contract interface 124. As previously described, the interface 124 may be stored on the local server 18 and the request may be received from a work station 22 via a local area network (LAN) 20. It will be understood that a request to display the contract interface 124 may be otherwise received by the contract management system and still remain within the scope of the present invention.

At step 302, the contract management system may automatically display the interface 124 as a series of graphical displays providing selections for manipulating the contract negotiation records. As previously described, the contract negotiation records 40 may be stored in a central server 14 connected to the local server 18 via a wide area network (WAN) 16. The interface 124 may be displayed to the user on the work station 22. It will be understood that the interface may be otherwise displayed to the user and remain within the scope of the present invention.

Proceeding to step 304, a selection of a contract negotiation record 40 may be received for duplication. At step 306, at least some of the fields of data of the selected contract negotiation record 40 may be duplicated to generate duplicating fields of data. In one embodiment, the duplicated fields of data may comprise the fields of data 54 of a contract record 50 of the selected contract negotiation record 40. It will be understood that other fields of data may be duplicated within the scope of the present invention.

Next, at step 308, the duplicated fields of data and a new unique contract field identifier associated with the duplicated fields of data may be stored. In one embodiment, the duplicated fields of data and the associated new unique identifier may be stored in the new contract negotiation record 40 in the database 30 of the central server 14. The new contract negotiation record 40 may be stored in part in the contract table 44 with the remainder stored in an associated activity table 46. In another embodiment, the duplicated fields of data and associated new unique contract identifier may be stored as a contract profile in the local server. It will be understood that the contract negotiation records 40 may be otherwise duplicated and/or manipulated within the scope of the present invention.

Figure 6:
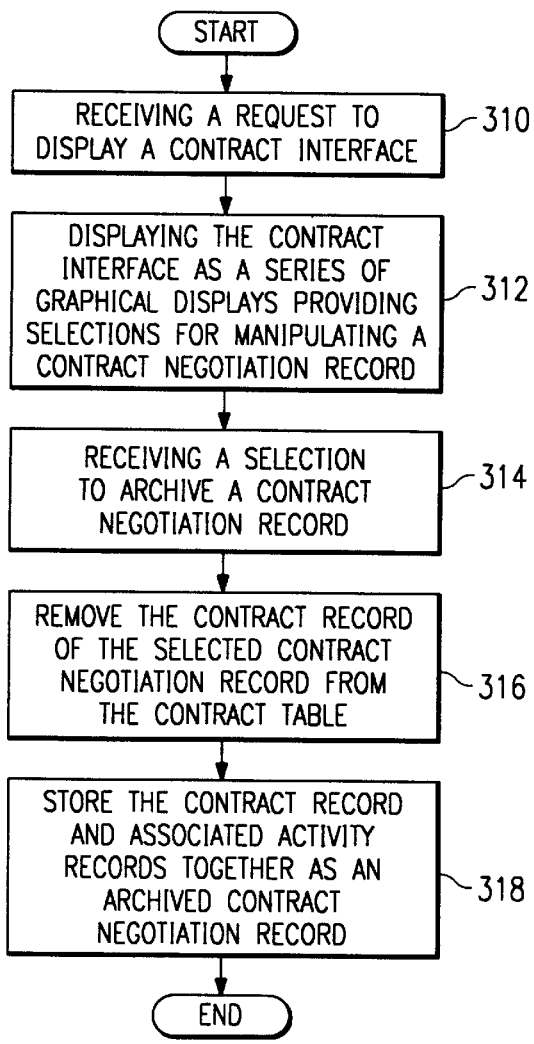
FIG. 6 is a flow chart illustrating a method of archiving a contract negotiation record in accordance with one embodiment of the present invention.

FIG. 6 is a flow chart illustrating a method of archiving a contract negotiation record in accordance with one embodiment of the present invention. The method may begin at step 310 with the contract management system 12 receiving a request to display the contract interface 124. Next, at step 312, the contract interface may be automatically displayed as a series of graphical screens providing selections from manipulating the contract negotiation records 40.

Proceeding to step 314, the interface 124 may receive a selection to archive a contract negotiation record 40. Next, at step 316, the contract record 50 of the selected contract negotiation record 40 may be removed from the contract table 44.

At step 318, the new contract record 50 may be stored together with its associated activity records 100 as an archived contract negotiation record 42. It will be understood that the contract negotiation records 40 may be otherwise archived and/or stored and still remain within the scope of the present invention.

Figure 7:
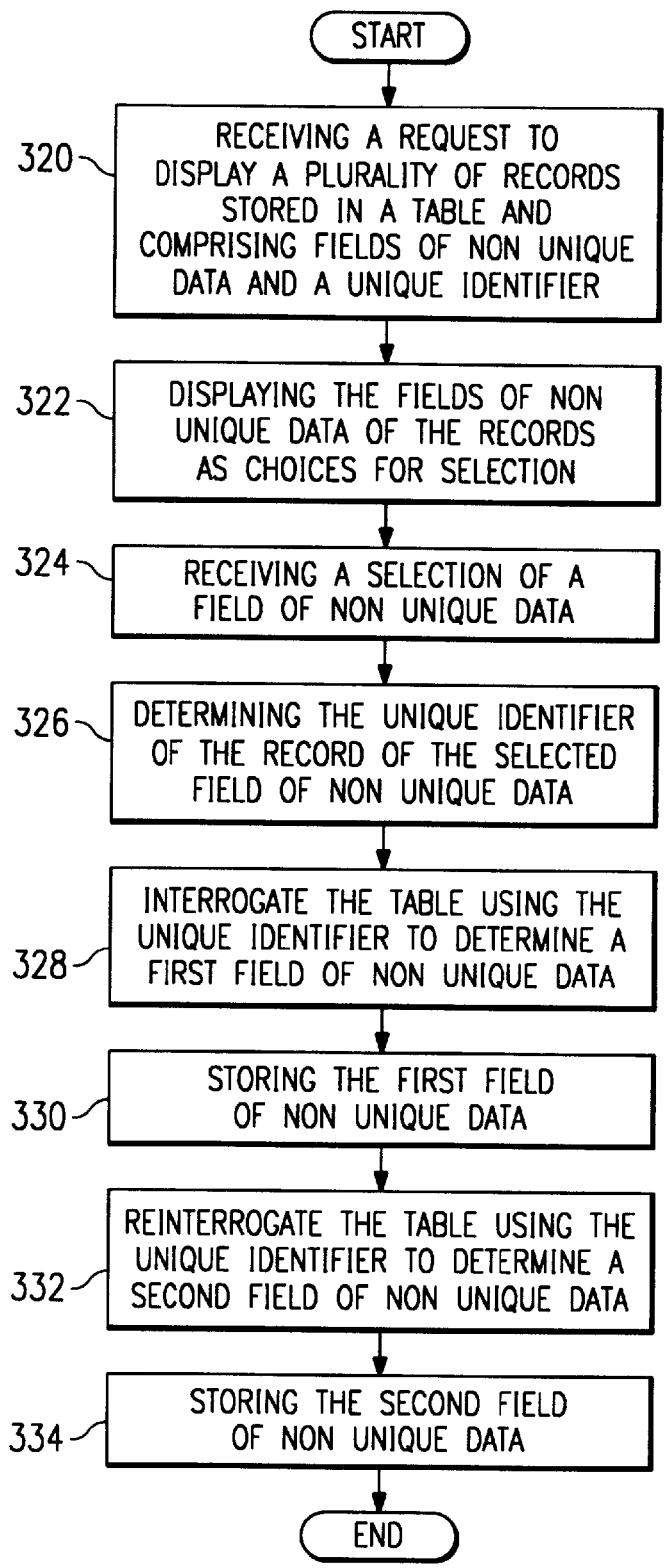
FIG. 7 is a flow chart illustrating a method of retrieving data from separate fields of a record in accordance with one embodiment of the present invention.

FIG. 7 is a flow chart illustrating a method of retrieving data from separate fields of a record in accordance with one embodiment of the present invention. This record may be used to achieve an organization code 224 and organization unit 226 when adding a contract record. The method may begin at step 320 with the contract management system 12 receiving a request to display a plurality of records stored in a table comprised in fields of non unique data and non unique identifiers. As previously described, the organization table 206 may comprise a unique identifier 222 and two fields of non unique data.

Proceeding to step 322, the fields of non unique data of the records may be displayed as choices for selection. Accordingly, the organization code field 224 and organization unit field 226 may be displayed to the user when selecting organization information for contract negotiation record 40.

At step 324, a selection of a field of non unique data may be received. Next, at step 326, the unique identifier of the record of the selected field of non unique data may be determined.

Proceeding to step 328, the table 206 may be interrogated using the unique identifier to determine a first field of non unique data. In one embodiment, the first field of non unique data may be the organization code 224 of the select record. The first field of non unique data may then be stored as part of the contract negotiation record.

Proceeding to step 332, the table 206 may be reinterrogated using the unique identifier to determine a second field of the non unique data. For the embodiment in which the first field of non unique data comprises organization code 224, the second field of non unique data may comprise the organization unit 226. The second field of non unique data may then also be stored as part of contract negotiation record 40. Accordingly, quality fields of data may be retrieved and stored based on the selection of one field of non unique data.

Although the present invention has been described with several embodiments, various changes and modifications may be suggested to one skilled in the art. It is intended that the present invention encompass such changes and modifications as fall within the scope of the appended claims.

What is claimed is:

1. A method of managing contract negotiation records, comprising the steps of:

receiving a request to display a contract interface;

automatically displaying the contract interface as a series of graphical displays providing selections for manipulating at least one of a plurality of contract negotiation records, each contract negotiation record comprising a plurality of fields of data, the data identifiying a contracting party and a unique contract identifier;

storing the contract negotiation records in a central server;

storing the contract interface in a network server;

receiving via the contract interface a selection of one of the contract negotiation records for duplication;

automatically duplicating at least some of the fields of data, including the contracting party, of the selected contract negotiation record to generate duplicated fields of data, including the contracting party, and automatically storing the duplicated fields of data and a new unique contract identifier associated with the duplicated fields of data.

2. The method of claim 1, the step of automatically storing the duplicated fields of data further comprising automatically storing the duplicated fields of data and the associated new unique contract identifier as a new contract negotiation record in a table comprising the selected contract negotiation record.

3. The method of claim 1, the network server remote from the central server.

4. The method of claim 3, the step of automatically storing the duplicated fields of data further comprising automatically storing the duplicated fields of data and the associated new unique contract identifier as a contract profile in the network server.

5. The method of claim 1, the step of automatically duplicating at least some of the fields of data further comprising automatically duplicating substantially all of the fields of data of the contract negotiation record to generate the duplicated fields of data.

6. The method of claim 1, the step of automatically duplicating at least some of the fields of data further comprising automatically duplicating all of the fields of data of the contract negotiation record to generate the duplicated fields of data.

7. The method of claim 1, wherein the duplicated fields of data comprise an identification, an address, a contact and a contact phone number of the contracting party.

8. The method of claim 1, wherein the duplicated fields of data further comprise a classification of the contract negotiation record.

9. The method of claim 1, wherein the duplicated fields of data further comprise a classification of the contracting party.

10. The method of claim 1, the data including at least one activity status field.

11. The method of claim 1, the data further comprising activity data, the activity data comprising activity date information and activity status information.

12. A method of managing contract negotiation records, comprising the steps of:

receiving a request to display a contract interface;

automatically displaying the contract interface as a series of graphical displays providing selections for manipulating at least one of a plurality of contract negotiation records, each contract negotiation record comprising a plurality of fields of data, the data identifying a contracting party and a unique contract identifier;

receiving via the contract interface a selection of one of the contract negotiation records for duplication;

automatically duplicating at least some of the fields of data, including the contracting party, of the selected contract negotiation record to generate duplicated fields of data, including the contracting party;

automatically storing the duplicated fields of data and a new unique contract identifier associated with the duplicated fields of data;

storing a contract table comprising a plurality of contract records, each contract record comprising a plurality of fields of contract data and a unique contract identifier; and storing a plurality of activity tables each comprising a plurality of activity records associated with one of the contract records to form one of the contract negotiation records, each activity record comprising a plurality of fields of activity data.

13. A Microsoft Access method of retrieving data from separate fields of a record, comprising the steps of:

receiving a request to display a plurality of records, the records stored in a table in a central server and each comprising a plurality of fields of non unique data of the records and a unique identifier;

automatically displaying in a work station the fields of non unique data of the records as choices for selection;

receiving a. selection of a field of non unique data;

automatically determining the unique identifier of the record of the selected field of non unique data;

automatically interrogating the table using the unique identifier to determine a first field of non unique data;

automatically storing the first field of non unique data;

automatically reinterrogating the table using the unique identifier to determine a second field of non unique data; and automatically storing the second field of non unique data.

14. The method of claim 12, further comprising the step of displaying the fields of non unique data on the work station remote from the central server.

15. A system for managing contract negotiation records, the system comprising:

a computer-readable medium; and software stored on the computer-readable medium, the software operable to receive a request to display a contract interface; to automatically display the contract interface as a series of graphical displays providing selections for manipulating at least one of a plurality of contract negotiation records, each contract negotiation record comprising a plurality of fields of data, the data identifying a contracting party and a unique contract identifier; to store the contract negotiation records in a central server; to store the contract interface in a network server; to receive via the contract interface a selection of one of the contract negotiation records for duplication; to automatically duplicate at least some of the fields of data including the contracting party, of the selected contract negotiation record to generate duplicated fields of data including the contracting party; and, to automatically store the duplicated fields of data and a new unique contract identifier associated with the duplicated fields of data.

16. The system of claim 15, the software further operable to automatically store the duplicated fields of data and the associated new unique contract identifier as a new contract negotiation record in a table comprising the selected contract negotiation record.

17. The system of claim 15, the network server remote from the central server.

18. The system of claim 17, the software further operable to automatically store the duplicated fields of data and the associated new unique contract identifier as a contract profile in the network server.

19. The system of claim 15, wherein the duplicated fields of data comprise an identification, an address, a contact and a contact phone number of the contracting party.

20. The system of claim 15, wherein the duplicated fields of data further comprise a classification of the contracting party.

21. The system of claim 15, the data further comprising activity data, the activity data comprising activity date information and activity status information.

* * * * *